(12) United States Patent
Awad et al.

(10) Patent No.: US 9,277,496 B2
(45) Date of Patent: Mar. 1, 2016

(54) CELL SELECTION

(75) Inventors: Yassin Aden Awad, Tokyo (JP); Vivek Sharma, Tokyo (JP); Satoshi Noma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 13/813,132

(22) PCT Filed: Aug. 12, 2011

(86) PCT No.: PCT/JP2011/068719
§ 371 (c)(1),
(2), (4) Date: Jan. 29, 2013

(87) PCT Pub. No.: WO2012/020851
PCT Pub. Date: Feb. 16, 2012

(65) Prior Publication Data
US 2013/0130682 A1   May 23, 2013

(30) Foreign Application Priority Data

Aug. 13, 2010  (GB) .................................. 1013639.8
Oct. 8, 2010  (GB) .................................. 1017019.9

(51) Int. Cl.
*H04W 4/00* (2009.01)
*H04W 48/20* (2009.01)
(Continued)

(52) U.S. Cl.
CPC .......... *H04W 48/20* (2013.01); *H04W 36/0061* (2013.01); *H04W 36/30* (2013.01); *H04W 84/045* (2013.01)

(58) Field of Classification Search
CPC ............ H04W 36/0061; H04W 36/30; H04W 36/0088; H04W 48/20; H04W 84/045
USPC ........................... 455/434, 504, 436; 370/331
See application file for complete search history.

(56) References Cited

U.S. PATENT DOCUMENTS 5,898,682 A    4/1999 Kanai
8,914,028 B2 *  12/2014 Gayde .................. H04W 48/06
                                                                 455/436
(Continued)

FOREIGN PATENT DOCUMENTS

CN    101610537 A    12/2009
CN    101772044 A     7/2010
(Continued)

OTHER PUBLICATIONS

International Search Report in PCT/JP2011/068719 dated Dec. 13, 2011.
(Continued)

*Primary Examiner* — Barry Taylor
(74) *Attorney, Agent, or Firm* — McGinn IP Law Group, PLLC (57) ABSTRACT

A first base station for use in a communications network, the first base station having a first cell operating range, comprising: means for obtaining data relating to at least one characteristic of a signal transmitted by a second base station having a second cell operating range which is different from and overlaps with the first cell operating range of the first base station; means for determining a cell selection bias value for the first or second base station using the obtained data; and means for transmitting the determined cell selection bias value to a user device within the first cell operating range of the first base station.

32 Claims, 8 Drawing Sheets

(51) Int. Cl.
 H04W 36/00 (2009.01)
 H04W 36/30 (2009.01)
 H04W 84/04 (2009.01)

(56) References Cited

U.S. PATENT DOCUMENTS

| | | | |
|---|---|---|---|
| 2001/0011019 A1 | 8/2001 | Jokimies | |
| 2010/0035615 A1 | 2/2010 | Kitazoe et al. | |
| 2010/0067491 A1* | 3/2010 | Park et al. | 370/332 |
| 2010/0103867 A1 | 4/2010 | Kishiyama et al. | |
| 2010/0157845 A1 | 6/2010 | Womack et al. | |
| 2010/0178912 A1* | 7/2010 | Gunnarsson et al. | 455/423 |
| 2010/0216469 A1 | 8/2010 | Yi et al. | |
| 2010/0273489 A1 | 10/2010 | Narasimha | |
| 2010/0317386 A1 | 12/2010 | Da Silva et al. | |
| 2011/0081927 A1* | 4/2011 | Gerstenberger et al. | 455/506 |
| 2011/0110251 A1* | 5/2011 | Krishnamurthy et al. | 370/252 |
| 2011/0249579 A1* | 10/2011 | Hu et al. | 370/252 |
| 2011/0287768 A1 | 11/2011 | Takamatsu et al. | |
| 2012/0106370 A1* | 5/2012 | Radulescu et al. | 370/252 |
| 2012/0244903 A1* | 9/2012 | Fong et al. | 455/517 |

FOREIGN PATENT DOCUMENTS

| | | |
|---|---|---|
| EP | 2257102 A1 | 12/2010 |
| GB | 2311191 A | 9/1997 |
| GB | 2456126 A | 7/2009 |
| JP | 2008/193439 A | 8/2008 |
| WO | WO98/38806 A2 | 9/1998 |
| WO | WO/0018164 A1 | 3/2000 |
| WO | WO 2009/053710 A1 | 4/2009 |
| WO | WO2009/057960 A1 | 5/2009 |
| WO | WO2009/079256 A1 | 6/2009 |

OTHER PUBLICATIONS

Kyocera: "Potential Performance of Range Expansion and PDCCH Interference Management", 3GPP Draft; RI-104066 RE_OUTHOT, $3^{rd}$ Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010, Jun. 22, 2010, pp. 1-15, XP050449370, [retrieved on Jun. 22, 2010] Par.2, Figure 1.

Intel Corporation (UK) LTD: "Non-CA based PDCCH Interference Mitigation in LTE-A", 3GPP Draft; RI-102814 EICIC, $3^{rd}$ Generation Partnership Project (3GPP), Mobile Competence Centre; 650, Route Des Lucioles; F-06921 Sophia-Antipolis Cedex; France, vol. RAN WG1, no. Montreal, Canada; May, 10, 2010, May 6, 2010, pp. 1-7, XP050420360, [retrieved on May 6, 2010] Par. 3.

Qualcomm Incorporated: "Increasing Footprint of Low Power Nodes for Improved Performance", 3GPP Draft; RI-103563, $3^{rd}$ Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010, pp. 1-9, [retrieved on Jun. 28, 2010].

Japanese Office Action dated Jan. 15, 2014, with English translation.
Alcatel-Lucent, HNB Inbound Mobility Cell Individual Offset, R2-102055, 3GPP, Apr. 16, 2010.
Motorola, Measurement events for handover to allowed CSG cells and preferred hybrid cells, R2-095925, 3GPP, Oct. 16, 2009.
ZTE, Complementarity of Mobility Robustness Optimization Use Case, R3-091201, 3GPP, May 8, 2009.
Chinese Office Action and Search Report dated Feb. 16, 2015.

\* cited by examiner

CELL SELECTION

TECHNICAL FIELD

The present invention relates to mobile telecommunication networks and, particularly but not exclusively, networks operating according to the 3GPP standards or equivalents or derivatives thereof. The invention has particular although not exclusive relevance to the Long Term Evolution (LTE) of UTRAN (called Evolved Universal Radio Access Network (E-UTRAN)).

BACKGROUND ART

In a mobile telephone network, a user equipment may be in a region in which it is able to receive signals relating to more than one cell of the network. In order to determine which cell to connect to, measurements of received signal power of a signal from a base station (also known as an eNB in LTE standard) associated with each cell can be made and the cell corresponding to the base station having the highest or strongest Reference signal Received Power (RSRP) is chosen.

Figure 1:
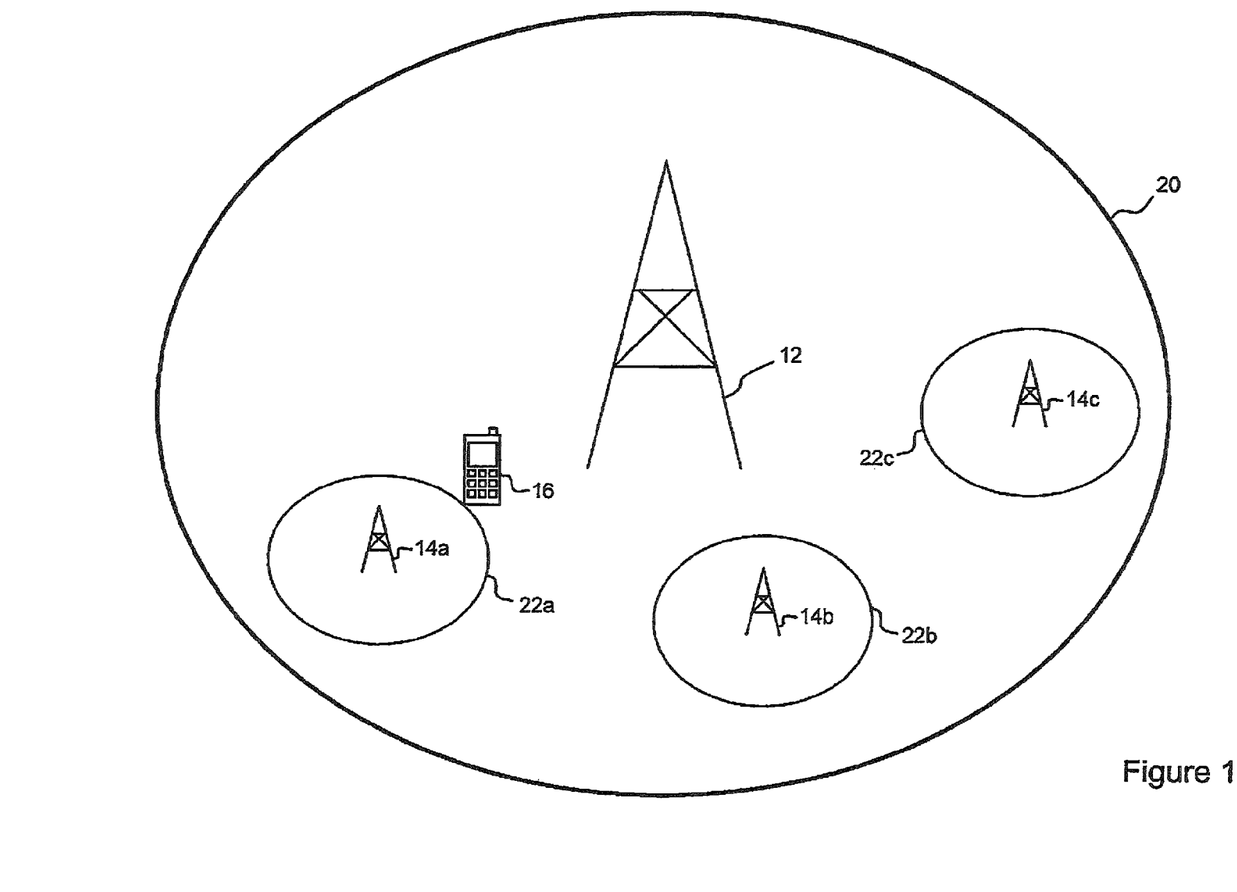
FIG. 1 schematically illustrates a heterogeneous wireless telecommunication system including low power cells.

FIG. 1 shows a wireless communication network in which an eNB 12 of a macro cell, having a relatively high transmitted signal power and therefore covering a relatively large area 20, may be supplemented with one or more low power eNBs 14a, 14b, 14c corresponding to pico cells located within the area 20 covered by the macro cell. For example the low power eNBs may be used to provide extra capacity at a hotspot or to improve coverage in a low signal area within the area of a macro cell. This leads to user equipment 16 located near to the edge of a pico cell 14a receiving signals from both the macro eNB 12 and pico eNB 14a. In the RAN1#61Bis meeting in Dresden 28 Jun. to 2 Jul. 2010, it was proposed that an RSRP bias mechanism should be implemented such that user equipments should preferentially connect to the pico cell under certain circumstances.

This RSRP bias mechanism allows user equipments 16 being served by a macro cell 12 but near to a pico cell 14a, for example as determined by pathloss criteria, to camp on the pico cell 14a even if handover/cell reselection criteria based on RSRP are not met. According to the proposed biasing mechanism, an offset or threshold value is added to the RSRP of the low power cell before comparing it with the RSRP of the macro cell. Thus, the lower power cell will be selected even if the reference signal received power for that cell is lower than the RSRP for the macro cell by up to the threshold amount.

Without RSRP biasing, cell selection between the pico cell and the macro cell is based on the strongest signal, i.e. highest RSRP value. This leads to the footprint of the pico cell being limited by interference from the macro cell, and limits the number of user equipment devices that are able to benefit from the hotspot provided by the pico cell.

Using the RSRP bias mechanism, user equipment can be controlled to preferentially connect to the pico cell, even when the pico cell has a lower measured RSRP than the macro cell. In effect, this provides a range expansion for the low powered pico cell, increasing the size of the area served by the pico cell, and allowing more traffic to be offloaded from the macro cell to the pico cell. The RSRP biasing mechanism is applicable to heterogeneous networks comprising a mix of high power, macro, cells and lower power cells such as pico or hybrid cells.

However, while the use of RSRP bias has been proposed, details of how such a mechanism could be implemented have not yet been considered.

DISCLOSURE OF INVENTION

Embodiments of the present invention aim to provide a method of implementing a RSRP bias mechanism in a mobile communication network to allow user equipment devices to preferentially connect to a pico cell in a heterogeneous wireless network comprising overlapping macro and pico cells.

According to one aspect of the invention, there is provided a first base station for use in a communications network, the first base station having a first cell operating range, comprising: means for obtaining data relating to at least one characteristic of a signal transmitted by a second base station having a second cell operating range which is different from and overlaps with the first cell operating range of the first base station; and means for determining a cell selection bias value (which may be an offset or gain value) for the first or second base station using the obtained data. The base station may then transmit the determined cell selection bias value to a user device within the first cell operating range of the first base station.

The means for obtaining data may comprise means for receiving signal measurement reports from user devices within the first cell operating range of the first base station, and the means for determining may be configured to use the received signal measurement signals to determine the cell selection bias values for the first or second base station.

The signal measurement reports may comprise one or more of: a physical cell identifier, a reference signal received power, geographical location of a user device, and a pathloss measurement. Furthermore, the signal measurement reports may relate to signals transmitted by a plurality of base stations and/or may relate to signals transmitted by the first base station or the second base station. The measurement reports will typically be obtained from many different user devices, and the cell selection bias value is preferably updated to reflect the changing path characteristics within the cell.

The first base station may further comprise means for instructing user devices within the first operating cell range of the first base station to generate the signal measurement reports. The instructions may instruct the user devices may comprise means for instructing the user devices using an automatic neighbour relation management function, or a minimization of drive testing mechanism.

Alternatively, the means for obtaining data may be means for exchanging information between the first and second base stations. The means for exchanging data between the base stations may comprise a dedicated network interface, for example the X2 interface. The information exchanged between the base stations may include transmitted signal power, physical cell identifiers, and cell operating types.

The first base station may use the exchanged data to calculate a pathloss value for signals received at a user equipment, responsive to a reference signal received power value measured at the user equipment.

The pathloss value may be determined using:

$$\text{Pathloss(dB)} = 10\log_{10}\left(\frac{Y \times BW}{X_{Tot}}\right)$$

where Y is the reference signal received power value, $X_{Tot}$ is the total transmit power of the transmitting base station, and BW is the bandwidth in terms of number of subcarriers of the base station transmitting the reference signal. Alternatively, the pathloss value may be determined using:

$$\text{pathloss(dB)} = 10\log_{10}\left(\frac{Y}{X_{sc}}\right)$$

where Y is the reference signal received power value, and $X_{SC}$ is the transmit power of the reference signal. The determined pathloss value may then be used to determine the cell selection bias value to be provided to user device.

The first base station will typically be a macro base station and the second base station will typically be a pico, home base station or hybrid or a relay node. However, the invention is also applicable where the first base station is a pico/home base station/hybrid/relay node and the second base station is a macro base station.

According to another aspect of the invention, there is provided a method of controlling serving cell selection in a wireless communication network, the method comprising: obtaining data relating to at least one characteristic of a signal transmitted by a second base station having a second cell operating range which is different from and overlaps with the first cell operating range of the first base station; determining a cell selection bias value for the first or second base station using the obtained data. The method may also comprise transmitting the determined cell selection bias value to a user device within the first cell operating range of the first base station.

The step of obtaining data may comprise receiving signal measurement reports from user devices within the first cell operating range of the first base station; and the cell selection bias value may be determined based on the received signal measurement reports.

The received signal measurement reports may comprise one or more of: a physical cell identifier; a reference signal received power; geographical location of a user device, and a pathloss measurement. The received signal measurement reports may relate to signals transmitted by a plurality of base stations, and/or the received signal measurement reports may relate to signals transmitted by the first base station or the second base station.

The method may further comprise instructing the user devices within the first operating cell range of the first base station to generate the signal measurement reports, and instructing the user devices may comprise instructing the user devices using one of automatic neighbour relation management, and minimization of drive testing.

Alternatively, obtaining data may comprise exchanging information between the first and second base stations, for example over a network interface between the base stations such as the X2 interface.

According to another aspect of the invention, there is provided a user device for use in a communications network, the user device comprising: means for obtaining signal measurements for signals communicated between the user device and a plurality of base stations within communication range of the user device, the base stations having different and overlapping cell operating ranges; means for obtaining a cell selection bias value for a base station, which cell selection bias value is determined using the signal measurements; and means for selecting a base station on which to camp in dependence upon signal measurements obtained for the plurality of base stations and the cell selection bias value.

The means for obtaining a cell selection bias value may comprises one of: means for receiving a cell selection bias value from a first base station of the plurality of base stations; and means for calculating a cell selection bias value in dependence on the obtained signal measurements.

The user device may further comprise means for determining a cell type for each of the plurality of base stations.

According to another aspect of the invention, there is provided a method of selecting a base station in a wireless communication network, the method comprising: obtaining signal measurements for signals communicated between a user device and a plurality of base stations within communication range of the user device, the base stations having different and overlapping cell operating ranges; obtaining a cell selection bias value for a base station, which cell selection bias value is determined using the signal measurements; and selecting a base station on which to camp in dependence upon signal measurements obtained for the plurality of base stations and the cell selection bias value.

Obtaining a cell selection bias value may further comprise one of: receiving a cell selection bias value from a first base station of the plurality of base stations; and calculating a cell selection bias value in dependence on the obtained signal measurements.

The method may further comprise determining a cell type for each of the plurality of base stations.

According to another aspect of the invention there is provide a computer program product comprising computer program code adapted when executed on a processor to perform the steps of any of the above methods The invention also provides corresponding base stations and UEs for performing the above methods.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF DRAWINGS

An embodiment of the invention will now be described, by way of example only, with reference to the accompanying drawings in which.

BEST MODE FOR CARRYING OUT THE INVENTION

Figure 2:
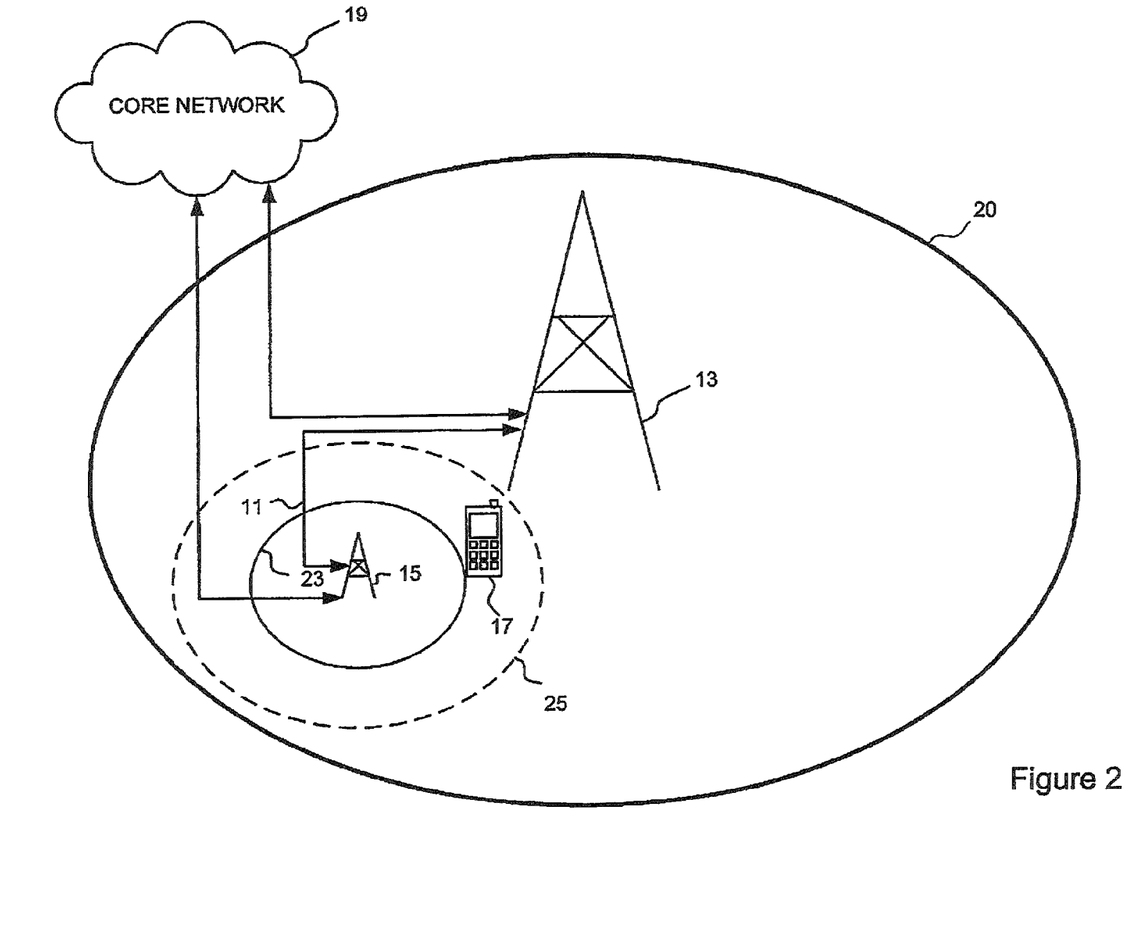
FIG. 2 schematically illustrates a heterogeneous wireless telecommunications system including low power cells having range extension in accordance with the invention.

FIG. 2 schematically illustrates a cell of a wireless (cellular) telecommunication system 11 in which the user of a user equipment 17 can communicate with other users (not shown), and with the core network via a macro cell associated with eNB 13 of the wireless communication network, or via one of a number of low power cells provided by low power eNBs 15 for example pico cells. In the wireless telecommunication system, a macro cell 20 is provided by the base station 13 (or eNB). Within the area covered by the macro cell, a number of low-power cells provided by low power eNBs 15 are provided to increase capacity in specific areas within the macro cell. A network interface 11 is optionally provided between the low power eNB 15 and the macro eNB 13 to allow data to be exchanged directly between neighbouring eNBs. The low power cells may comprise pico cells, open access Home eNB, hybrid or relay cells.

At any one time, a user equipment 17 may be able to receive signals relating to a number of different cells. For example, a user equipment located near the edge of one cell may receive signals relating to a serving cell and also a neighbouring cell, or as in the system shown in FIG. 2, a user equipment 17 located in or near the pico cell 23 will receive signals from both the low power eNB 15 and the eNB 13 of the macro cell. In order to implement RSRP biasing at the user equipment, the user equipment needs to understand the type of cell the received signals relate to.

In this present embodiment, RSRP bias is controlled by a macro cell serving the user equipment. The macro cell has knowledge of the local configuration of eNBs, and in particular of the presence of any low power eNBs 15 within the area of the macro cell 20, and therefore knows the type of each cell from which a user equipment 17 located within the area of the macro cell 20 may receive signals. When the user equipment 17 reports that it is able to receive signals from multiple eNB 13, 15, the macro node determines whether any of the eNBs are a low power eNBs 15 and if so, instructs the user equipment 17 to implement RSRP biasing for a serving cell selection procedure including those low power eNBs. Furthermore, the macro cell calculates an RSRP biasing threshold based on ongoing measurements of signal characteristics within the area of the macro cell to allow the biasing threshold to be optimized according to measured signal properties from the multiple eNBs. This may allow the serving eNB to optimize the biasing threshold according to operation of the network. The calculated threshold can then be provided to one or more user equipments within the area of the macro cell for use in the serving cell selection procedure.

Two methods of determining an RSRP biasing threshold are outlined below, a first method based on signal measurement reports from multiple user equipments operating within the area of the macro cell 20, and a further method in which the serving eNB uses information exchanged between neighbouring eNBs to determine an RSRP biasing threshold.

User Equipment Measurements

According to one embodiment of the invention, measurements of signal properties received by user equipment operating in the macro cell are used to calculate the biasing threshold. The macro eNB 13 collects measurements from multiple user equipments operating in the area of the macro cell 20, the measurements relating to signals received from multiple eNBs by the user equipment. The macro eNB 13 can then use these measurements to determine an appropriate value for the RSRP bias threshold. Each user equipment can be instructed to measure and report received signal strength, for example RSRP, and information relating to pathloss characteristics for signals received from each eNB by the user equipment along with a Physical Cell Identifier (PCI) that allows each cell to be identified. In some arrangements, the user equipments may be arranged to report a geographical location along with the signal measurements.

According to one embodiment, the signal measurements from multiple UEs are statistically collected at the macro eNB 13 to determine average values for the RSRP and pathloss for each cell identified by a unique PCI value to allow the appropriate value for the RSRP bias threshold to be calculated. Furthermore, the UEs may also report a current speed of the UE which may be used by the macro eNB to further refine the calculated bias value.

One way in which the macro eNB 13 could collect the required measurements is via the Automatic Neighbour Relation (ANR) management mechanism. This mechanism allows an eNB to instruct each user equipment to perform measurements on neighbour cells, as part of the normal call procedure. The ANR protocol may be extended to include the received signal strengths and pathloss data in the measured values, along with the PCI of the neighbouring cells. The use of the PCI values may provide sufficient localization of the measurement (if macro eNB is aware that a specific PCI belongs to a pico cell) to allow the threshold values to be calculated. However, accuracy may be increased by inclusion of geographical reporting. If geographical reporting is required, it may be necessary to extend the current ANR mechanism to include this information.

Alternatively, the minimization of drive tests mechanism MDT could be enhanced to report received signal strength and pathloss data, alongside geographic location at which the measurements were taken.

Figure 3:
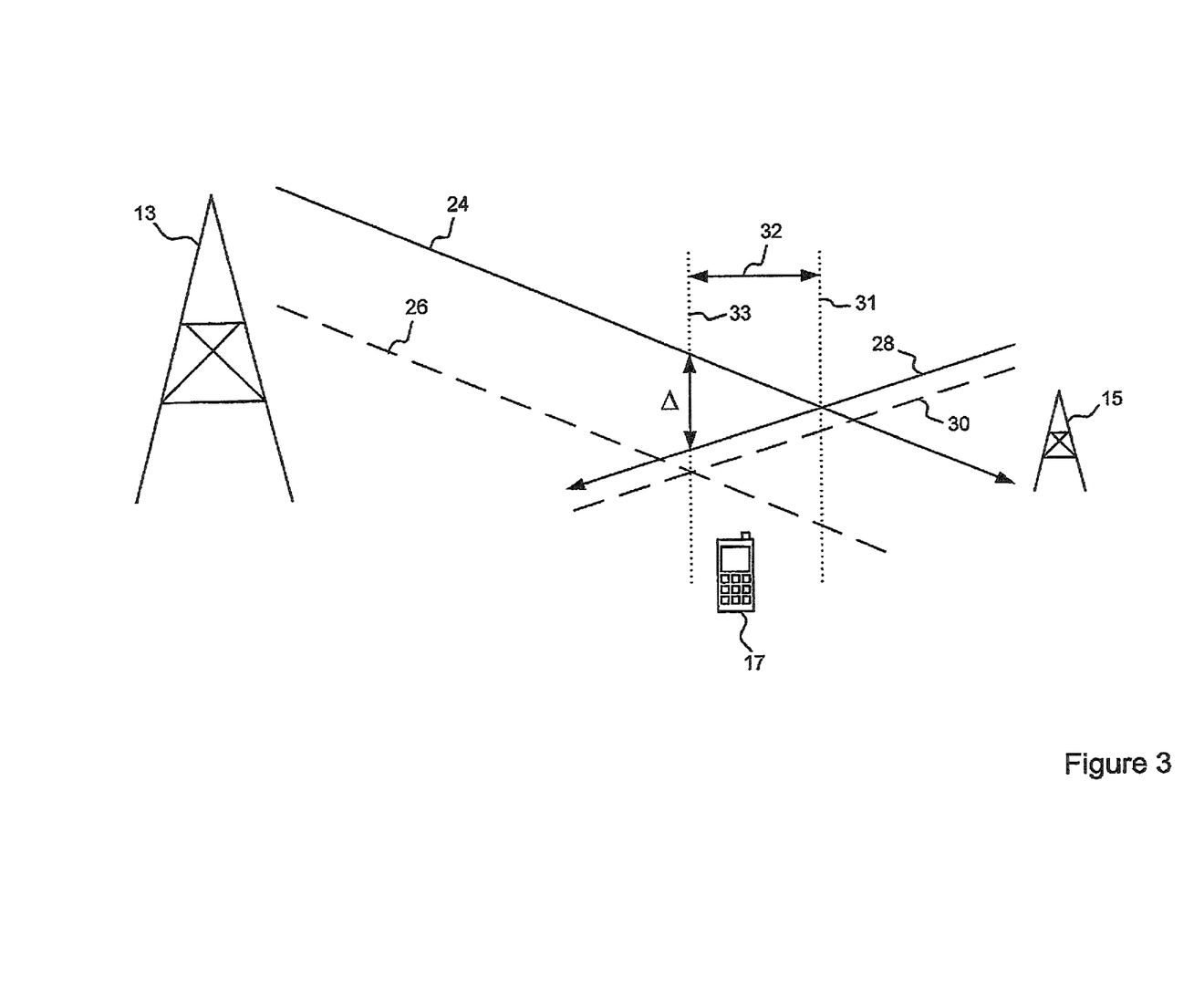
FIG. 3 illustrates signal levels received by a user equipment located between two transmitters in the wireless telecommunications system of FIG. 2.

The macro eNB 13 can use the reported measurement to determine the threshold value by comparing the RSRP and pathloss values for signals from different eNBs measured by UEs within the area of the macro cell 20. FIG. 3 illustrates the situation in the network of FIG. 2 in which a user equipment 17 is located between the macro cell 20 and one of the pico cells 23. Solid lines 24 and 28 illustrate the reference signal received power received at a UE for the macro eNB 13 and pico eNB 15 respectively against distance from the respective cell, and dashed lines 26 and 30 illustrate 1/pathloss experienced by signals transmitted by the macro and pico eNB. As the pico eNB 15 transmits at much lower power than the macro eNB 13, the reference signal received power 28 for signals from the pico eNB 15 drops below the level of the RSRP 24 for the macro cell 20 within a short distance (represented by line 31) from the pico cell transmitter. However, due to the smaller distance to the pico eNB 15 often the pathloss 30 for the signal from the pico eNB may be much less than the pathloss 26 for the signal from the macro eNB 13 as shown in FIG. 3. This leads to a region 32 in which the measured RSRP for signals from the pico eNB 15 is lower than that from the macro eNB 13, however taking into account the pathloss for the two signals improved performance may be realized by connecting to the pico cell rather than the macro cell. At the distance between the macro and pico eNBs shown by line 33 in FIG. 3, the pathloss will be approximately the same for signals transmitted from both the macro and pico eNBs. The difference in RSRP for the signals from the two eNBs at which pathloss is approximately equal, is shown in FIG. 3 as Δ, and indicates an optimal threshold value for the RSRP biasing mechanism.

Once the threshold value has been determined at the macro cell, this value is indicated to the user equipment 17 by the macro cell, for example in Radio Resource Control (RRC) signaling. The threshold value provided to the user equipment 17 may be associated with a specific PCI value, thereby associating the threshold with the low power eNB 15. Applying the RSRP bias threshold during serving cell selection between the low power eNB 15 and the eNB 13 of the macro node leads to a range extension of the area covered by the low power cell, as shown by the dashed area 25 in FIG. 2.

Thus, the threshold value can be determined based on a plurality of measurements taken by a one or more user equipments located throughout the area 20 of the macro cell, allowing the macro cell to optimize the cell selection bias threshold based on pathloss and RSRP measurements.

Figure 4:
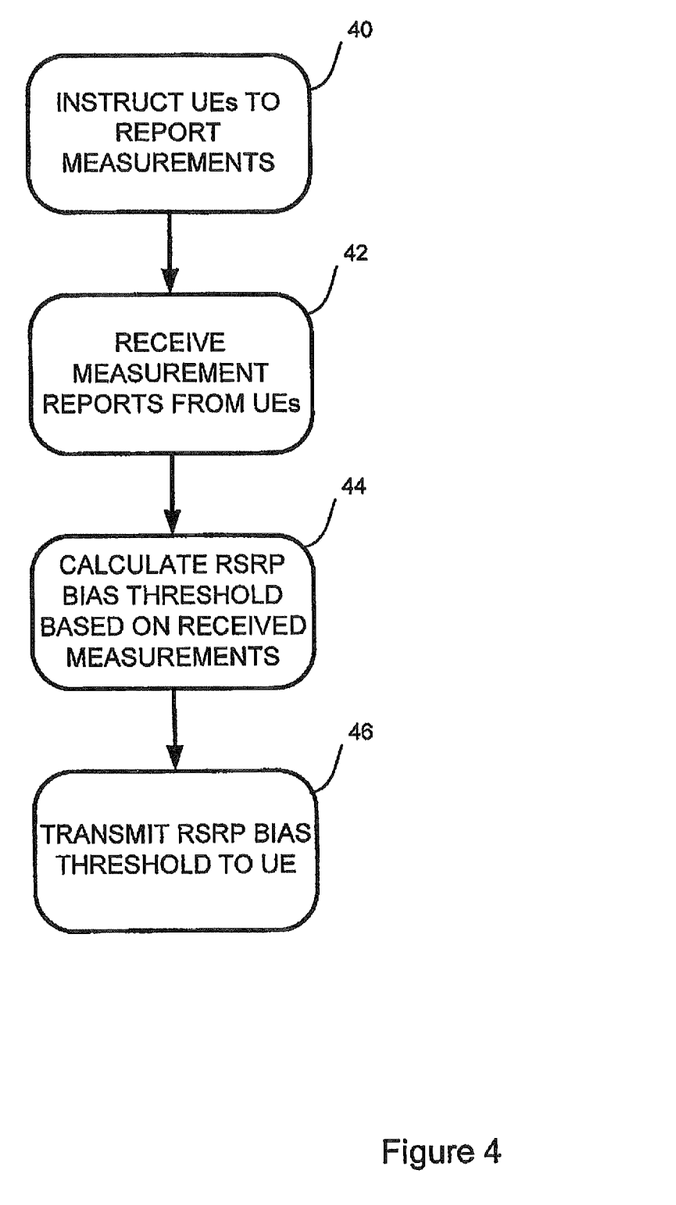
FIG. 4 illustrates a method of providing a RSRP bias threshold value in the network.

FIG. 4 illustrates a method of controlling selection of a serving cell according to embodiments of the invention. In the first step 40, a serving eNB instructs user equipments within the cell served by the eNB to perform measurements of RSRP and pathloss values for signals being received from other eNBs as well as from the serving eNB. These values are received at the serving eNB at step 42 which then uses these values, along with knowledge of any low power cells within the macro cell area to calculate RSRP bias threshold values for the low power cells based on the measurements provided by the UEs in step 44. These RSRP bias threshold values can then be transmitted to a UE which is within range of a pico cell for use in performing the serving cell selection procedure.

In some embodiments, the UEs may also report the type of each cell for which measurements have been performed. The macro eNB may then use this data to generate the knowledge of low power cells within the macro cell area.

Inter-eNodeB Communication

In many wireless communication networks the macro eNB 13 is able to communicate with neighbouring eNBs directly via a network interface 11, for example the X2 interface for eNBs implemented according to the LTE standard. In an alternative embodiment, information is exchanged between eNBs to enable the macro eNB 13 to determine RSRP bias values without requiring collection of signal measurements from multiple UEs in the area served by the macro cell. In this embodiment, the macro eNB 13 receives information over the network interface 11 from neighbouring eNBs including low power eNB 15. The received information identifies the sending eNB, and includes data identifying the cell type of the sending eNB (e.g. pico, hybrid or open HeNB or Relay node, macro cell or CSG HeNB) and also a parameter defining the transmitted power of wireless network signals at the sending eNB. For example, such information may be transmitted during an X2 interface connection setup procedure between neighbouring eNBs.

Thus, the macro eNB 13 is provided with information of cell identities, types and transmission powers for neighbouring cells.

A user equipment connected to the macro eNB 13 and receiving signals from another eNB such as low power eNB 15 will report the PCI (Physical Cell Identifier) for the eNB and RSRP values for signals received from the low power eNB 15 to the macro eNB 13. Using the information provided over the network interface 11, the macro eNB 13 will know that the reported PCI corresponds to a low power eNB 15. Furthermore, the macro eNB 13 is able to use the provided information to estimate the pathloss for signals from the low power eNB 15 without requiring any further measurements from user equipments.

Pathloss can be calculated, for example, using the following equation:

$$\text{Pathloss(dB)} = 10\log_{10}\left(\frac{Y \times BW}{X_{Tot}}\right)$$

where Y is the RSRP of the other cell measured by the UE and reported to the serving eNB, $X_{Tot}$ is the other cell's total transmit power reported to the serving cell over the network interface 11, and BW is the bandwidth of the other cell in terms of the number of subcarriers. Some filtering may be applied to the calculated values in order to ensure consistent values are calculated.

As a further example, the pathloss may be estimated using the following equation:

$$\text{Pathloss(dB)} = 10\log_{10}\left(\frac{Y}{X_{sc}}\right)$$

where $X_{SC}$ is the transmit power of one resource element or subcarrier. In particular, $X_{SC}$ may relate to a subcarrier that carries a reference or pilot signal, and the value of $X_{SC}$ is exchanged between eNBs over the network interface 11.

Thus, the serving eNB is able to calculate a pathloss value at the user equipment for each eNB for which the user equipment reports an RSRP value. If the calculated pathloss value indicates that the UE is near to a pico cell, such as low power eNB 15, then the macro eNB 13 will provide an RSRP bias offset value to the UE based on the calculated pathloss values. For example, if the calculated pathloss value for the low power eNB 15 is less than the pathloss value for the macro eNB 13, then the macro eNB 13 will provide an offset value to the UE to cause the UE to preferentially connect to the low power eNB 15.

In the alternative embodiment described above, signal measurements from multiple UEs within the area served by the cell are not required in order for the serving eNB to identify neighboring cell types and determine RSRP bias values, as the required information is exchanged between eNBs over network interface 11. Thus, the user equipment are only required to report RSRP values for signals received from other cells, which is standard operation in many wireless communication networks, for example LTE, in order to determine handover between cells. Thus, the alternative embodiment described above allows RSRP bias values to be obtained in a way that is completely transparent to UEs operating in the system, and does not require any enhanced functionality to be incorporated into the UEs.

Figure 8:
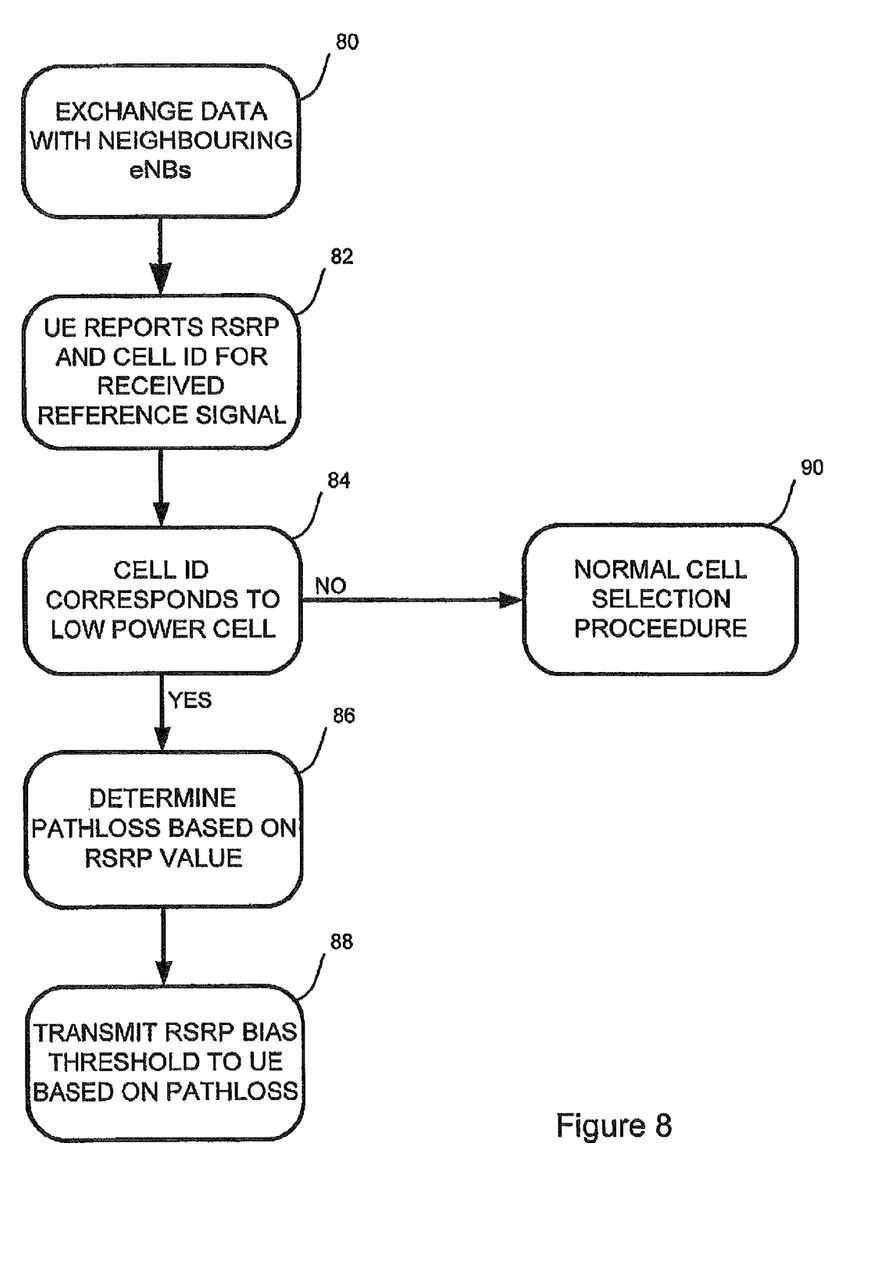
FIG. 8 illustrates a further method of providing a RSRP bias threshold value in the network.

FIG. 8 illustrates a method of providing an RSRP bias value to a UE in the network in which eNBs exchange information via network interface 11. As part of a setup procedure, neighbouring eNBs exchange data including cell identities and transmit powers at step 80. During a normal cell selection or handoff procedure, a user equipment reports received RSRP value and cell identity for signals received at the user equipment to the serving eNB in step 82. The serving eNB determines if the reported cell ID corresponds to a low power cell, by comparing the reported cell ID with the data exchanged with neighbouring eNBs at step 84. If the reported cell ID does not correspond to a low power cell, no range extension is implemented and therefore no RSRP bias value should be transmitted to the user equipment and a normal cell selection procedure takes place in step 90. If the cell ID does correspond to a low power cell, pathloss values are determined for signals received at the user equipment from the serving cell and the low power cell based on the reported RSRP values and the transmission power information exchanged between neighbouring eNBs at step 86. The pathloss values can then be used to determine an RSRP bias threshold which is transmitted to the user equipment at step 88.

While in the above embodiment, exchange of information has been described in the context of exchange between a serving macro eNB and a neighbouring eNB, the skilled person will recognize that information can also be exchanged between two low power eNBs, or a serving low power eNB and a neighbouring macro eNB.

Figure 5:
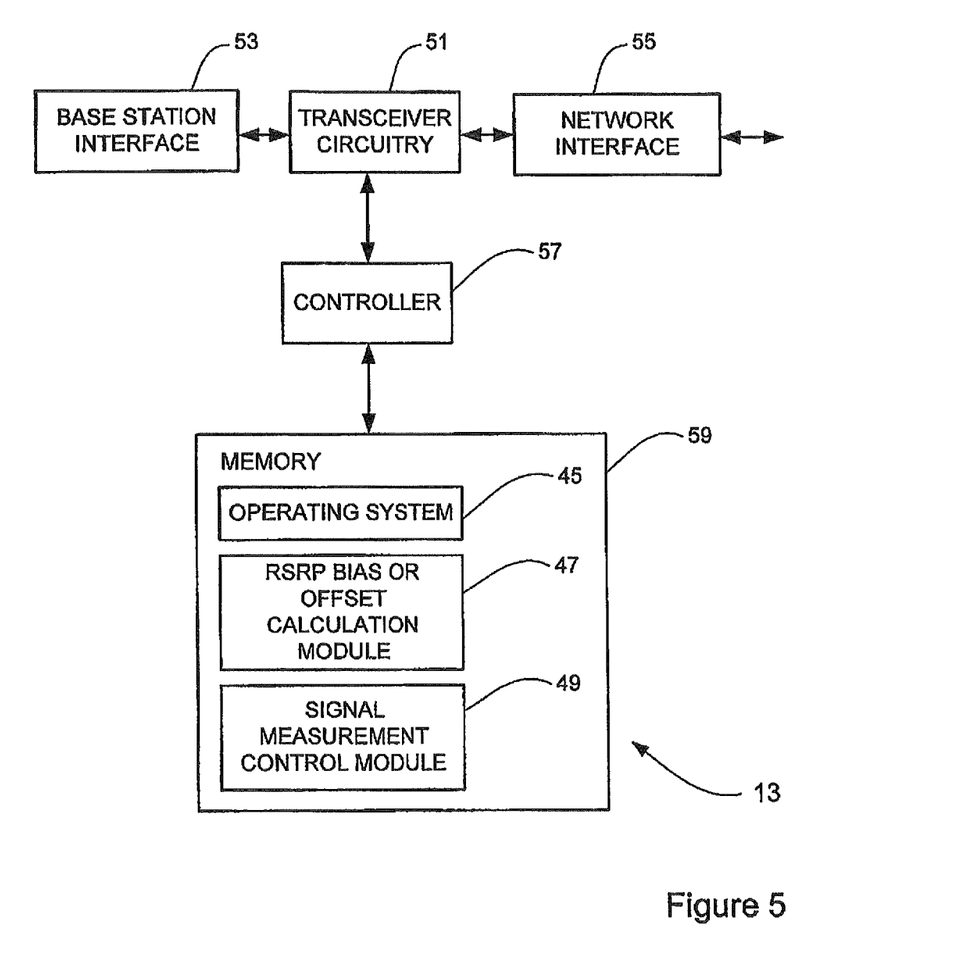
FIG. 5 is a block diagram of an eNB forming part of the wireless telecommunication system of FIG. 2.

FIG. 5 is a block diagram illustrating the main components of the macro eNB 13 shown in FIG. 2. As shown, the eNB 13 includes transceiver circuitry 51 which is operable to transmit signals to, and to receive signals from, the mobile telephone 17 via one or more antennae (base station interface) 53 and which is operable to transmit signals to and to receive signals from the network 19 via interface 55. The operation of the transceiver circuitry 51 is controlled by a controller 57 in accordance with software stored in memory 59. The software includes, among other things, an operating system 45, an RSRP bias or offset calculation module 47, and a signal measurement control module 49.

The signal measurement control module 49 provides functionality to instruct user equipment within the area of the macro cell to measure the required signal properties and report these measurements back to the macro eNB 13. The received measurements are then supplied to the RSRP bias calculation module 47 which calculates cell selection bias values for any pico cells within the area of the macro cell based on the measured signal properties. The calculated values are then supplied to user equipment for use in cell selection procedures via transceiver circuitry 51 and antennae (base station interface) 53.

For an eNB implementing the method of FIG. 8, the software modules will also include an information exchange module providing functionality to exchange information such as cell identities and transmission powers with neighbouring eNBs over the network interface.

While in the above embodiments, control of the RSRP bias has been described as being performed by the macro cell, in other embodiments control of the RSRP bias mechanism may be performed by a pico cell based on measurements received from UEs within the coverage area of the pico cell, by another network entity in communication with the macro or pico cells, or by information exchange between macro and pico cells for example via the X2 interface. According to some embodiments, the pico cell may inform neighbouring macro cells of the appropriate bias or offset values based on the measurements reported to the pico cell. As all measurements reported to the pico eNB 15 relate to signal measurements made within the small area of the pico cell, calculating the bias or offset values at the pico eNB based on the local signal measurements may allow for the bias value to be set optimally for the local pico cell.

In the above embodiments the RSRP bias is calculated by the serving cell. In an alternative embodiment the RSRP bias may be controlled by the user equipment itself. In order to determine when to apply an RSRP bias value in a cell selection, the user equipment must determine whether any of the local cells is a low power (pico) cell. This information may be provided by the serving cell in a message to the user equipment identifying the cell types of local cells.

Alternatively, the user equipment may be provided with a range of physical cell identifier (PCI) values that are reserved for pico and hybrid (i.e. low power) cells to which RSRP bias should be applied.

The user equipment may then apply a fixed threshold to the RSRP associated with the low power cell during the cell selection procedure, for example a fixed value of up to 6 dB may be chosen. Alternatively, the user equipment may calculate a threshold value based on some agreed guidelines negotiated between the network and the user equipment and using signal properties measured by the user equipment, or the calculation may be performed in some other implementation dependent manner.

The above example embodiments have been described in the context of a serving cell selection, or as a handover from a macro cell to a pico cell. However, embodiments of the present invention can also be used during handover of a pico cell to a macro cell. A user equipment connected to a pico cell moving into the region 32 would measure an RSRP 24 for the macro cell greater than the RSRP 28 for the pico cell. If the RSRP bias mechanism was not implemented for handovers from a pico cell to a macro cell, this would fulfill the normal handover criteria and the user equipment would handover to the macro cell. However, it may be preferable to maintain the connection to the pico cell while the user equipment is in the range extended area 25.

In order to avoid the user equipment handing over to the macro cell within the range extended area 25, a user equipment connected to a low power cell, such as a pico cell, must be aware that the serving cell is a low power cell so that the user equipment knows to apply the RSRP bias mechanism. This can be achieved by the low power cell informing the user equipment, or by the user equipment knowing a range of PCI values reserved for low power cells.

As with the macro to pico handover case, the RSRP biasing threshold must be applied to the RSRP of the low power cell before the cell selection procedure is performed. The biasing threshold may be provided by the network or calculated in the user equipment as described above.

Embodiments of the present invention are also applicable to networks including relay nodes. In particular, a mobile relay node located near the edge of a macro cell may apply an RSRP bias to mitigate interference from an adjacent cell. Also, providing 'cell type' information to user equipment to identify a node as a mobile relay node enables the user equipment to make connection decisions based on the status of the relay node.

In the case where a user equipment performs a handover from a pico cell to another pico cell, it may be preferable for the user equipment not to implement any RSRP biasing and to simply perform a normal handover procedure. Thus, the user equipment should be able to determine both whether the serving node is low power node and whether the neighbour is a low power node to ensure that RSRP biasing is correctly applied.

Figure 6:
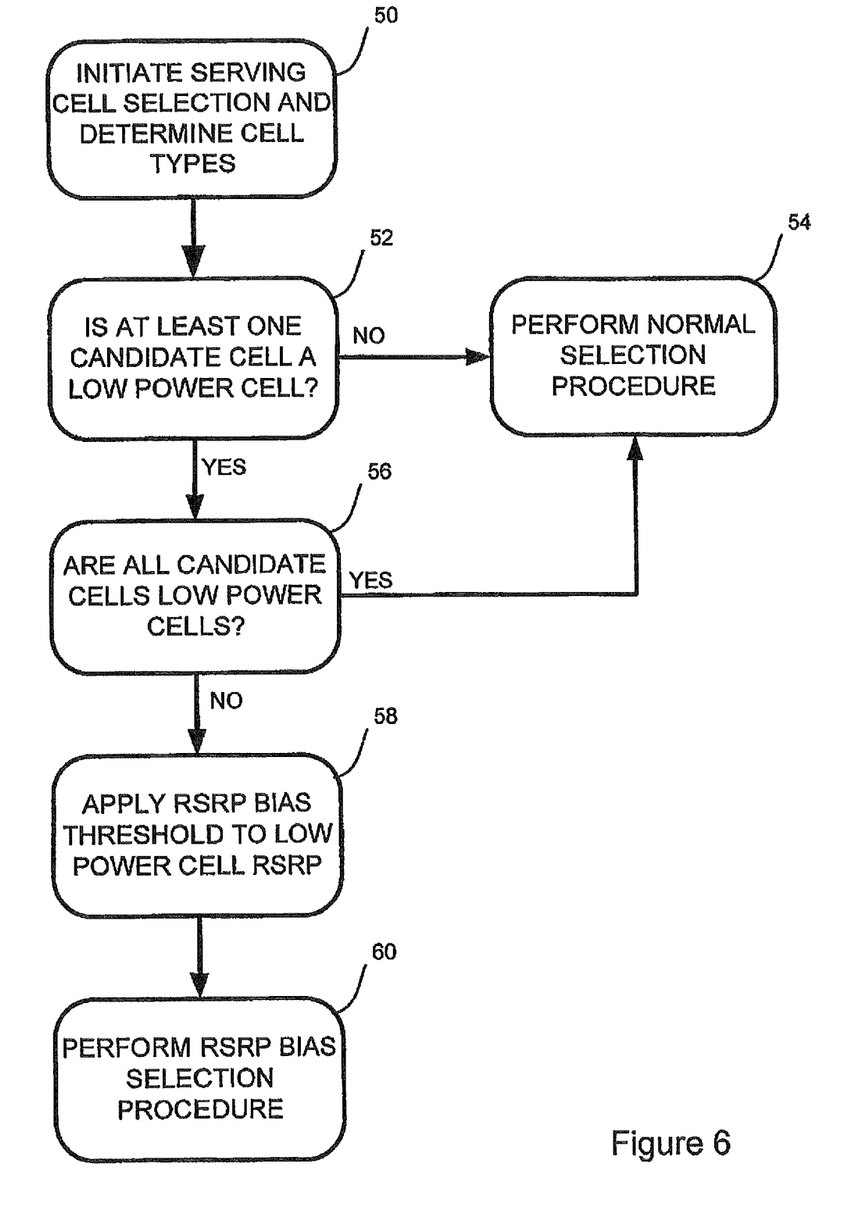
FIG. 6 illustrates a method of selecting a serving cell using RSRP bias.

FIG. 6 illustrates a method according to an embodiment of the invention for performing serving cell selection in a user equipment. When the serving cell selection procedure is initiated, for example during handover, the user equipment determines the type of each candidate cell in the selection procedure in step 50. If none of the candidate cells are determined to be a low power cell, such as a pico or hybrid cell, a normal selection procedure can be performed at step 54. However, if it is determined that at least one candidate cell is a low power cell, the RSRP bias selection procedure may be required. Optionally, if it is determined that all/both the candidate cells are low power cells, as shown at step 56, the normal selection procedure may be applied. In the next step 58 of the illustrated method, the RSRP bias threshold is added to the measured RSRP value for the low power cell, and then the selection procedure is performed using the adjusted RSRP values in step 60. If the RSRP of the low power cell added to the threshold value is greater than the RSRP of the macro cell then the low power cell is selected, else the macro cell will be selected by the user equipment.

The RSRP bias threshold value used by the user equipment in step 58 of the method illustrated in FIG. 6 may be supplied by the network via the serving eNB, for example having been determined using the method shown in FIG. 4, or may be determined within the user equipment as described above. Similarly, the determination of cell types may be based on information provided by the network, such as PCI ranges of low power cells provided in broadcast messages as described above. Alternatively, the determination of cell types may be based on data stored within the user device.

Figure 7:
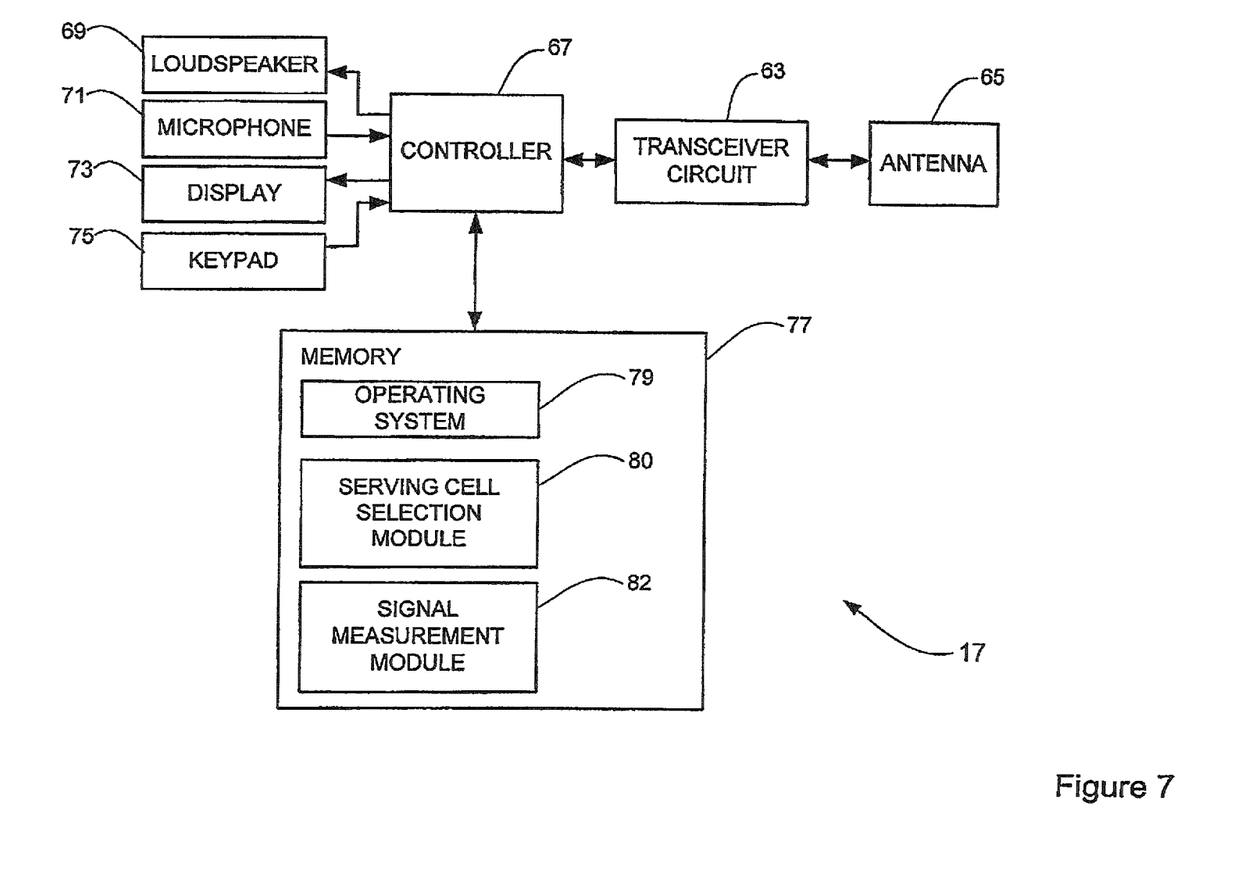
FIG. 7 is a block diagram of a user equipment forming part of the system shown in FIG. 2.

FIG. 7 schematically illustrates the main components of the user equipment 17 suitable for implementing embodiments of the invention shown in FIG. 2. As shown, the user equipment 17 includes transceiver circuitry 63 which is operable to transmit signals to and to receive signals from the macro eNB 13 or the low power eNB 15 via one or more antennae 65. As shown, the user equipment 17 also includes a controller 67 which controls the operation of the mobile telephone (user equipment) 17 and which is connected to the transceiver circuit 63 and to a loudspeaker 69, a microphone 71, a display 73, and a keypad 75. The controller 67 operates in accordance with software instructions stored within memory 77. As shown, these software instructions include, among other things, an operating system 79, a serving cell selection module 80, and a signal measurement module 82.

In embodiments of the invention in which the RSRP bias is controlled by the macro eNB 15 based on signal measurements from multiple UEs, the signal measurement module 82 is operable to receive an instruction from the eNB to measure signal properties for eNBs within range and provide the measurement results to the eNB. Serving cell selection module 80 allows the user equipment 17 to perform the serving cell selection procedure. This module allows the user equipment to obtain a RSRP bias value to be used in cell selection procedures involving a low power node. The RSRP bias value may be obtained from the macro eNB, or alternatively may be determined by the serving cell selection module 80.

In all embodiments of the invention, the threshold value is preferably less than or equal to 6 dB. Simulation results show that values lower than this provide a range extension to the pico cell that helps to mitigate interferences by offloading UEs from the macro cell to the pico cell. However, values greater than 6 dB could lead to issues with receiving the control channel, and may require further modifications to the operation of the network.

According to a further alternative embodiment, UEs may be provided with a list of PCI values and associated RSRP bias values by the network 19. Thus, a user equipment within range of multiple eNBs will receive the PCI value for each eNB and apply a bias value based on an associated RSRP bias value in the received list.

Detailed embodiments of the invention have been described above. As those skilled in the art will appreciate, a number of modifications and alternatives can be made to the above embodiment whilst still benefiting from the inventions embodied therein.

The above embodiments have been described with reference to user equipment. As those skilled in the art will appreciate, user equipment may comprise mobile telephones, personal digital assistants, laptop computers, or any other user device capable of interfacing with the wireless communication network.

While the embodiments have been described as applying a bias value to an RSRP for signals from a low power transmitter, the skilled man will appreciate that the same effect can be realized by subtracting the bias value from an RSRP for a macro cell.

In the above embodiments, a number of software modules were described. As those skilled will appreciate, the software modules may be provided in compiled or un-compiled form and may be supplied to the base station or to the user equipment as a signal over a computer network, or on a recording medium. Further, the functionality performed by part or all of this software may be performed using one or more dedicated hardware circuits. However, the use of software modules is preferred as it facilitates the updating of eNBs 13, 15 and the user equipment 17 in order to update their functionalities.

Various other modifications will be apparent to those skilled in the art and will not be described in further detail here.

This application is based upon and claims the benefit of priority from United Kingdom patent application No. 1013639.8, filed on Aug. 13, 2010, and United Kingdom patent application No. 1017019.9, filed on Oct. 8, 2010, the disclosures of which are incorporated herein in their entirety by reference.

The invention claimed is:

1. A first base station for use in a communications network, the first base station including a first cell operating range, comprising:
a transceiver operable to obtain a reference signal received power value of a signal transmitted by a second base station having a second cell operating range which is different from and overlaps with the first cell operating range of the first base station; and
a controller operable to determine, using the obtained reference signal received power value, a reference signal received power bias value for applying, by a user device, to a reference signal received power measured for the second base station when selecting a cell for handover,
wherein the transceiver is further operable to transmit the determined reference signal received power bias value to a user device within the first cell operating range of the first base station.

2. The first base station of claim 1, wherein the transceiver is further operable to obtain the reference signal received power value by receiving signal measurement reports from user devices within the first cell operating range of the first base station, and
wherein the controller is configured to determine the cell selection bias value for the second base station using the received signal measurement reports.

3. The first base station of claim 2, wherein the signal measurement reports comprise one or more of a physical cell identifier, the reference signal received power value, a geographical location of a user device, and a pathloss measurement.

4. The first base station of claim 2, wherein the signal measurement reports relate to signals transmitted by a plurality of base stations.

5. The first base station of claim 4, wherein the signal measurement reports relate to signals transmitted by the first base station and the second base station.

6. The first base station of claim 2, wherein the controller is further operable to instruct the user devices within the first operating cell range of the first base station to generate the signal measurement reports.

7. The first base station of claim 6, wherein the controller is further operable to instruct the user devices using one of an automatic neighbor relation management, and a minimization of drive testing mechanism.

8. The first base station of claim 1, wherein the transceiver is further operable to obtain the reference signal received power value by exchanging information between the first and second base stations.

9. The first base station of claim 8, wherein the exchanged information comprises one or more of:
   a transmitted signal power;
   a physical cell identifier; and
   a cell operating type.

10. The first base station of claim 8, wherein the controller is further operable to determine the cell selection bias value by determining a pathloss value responsive to the reference signal received power value.

11. The first base station of claim 10, wherein the pathloss value is determined using:

$$\text{Pathloss(dB)} = 10\log_{10}\left(\frac{Y \times BW}{X_{Tot}}\right)$$

where Y is the reference signal received power value, $X_{Tot}$ is the total transmit power of the transmitting base station, and BW is the bandwidth in twos of number of subcarriers of the base station transmitting the reference signal.

12. The first base station of claim 10, wherein the pathloss value is determined using:

$$\text{Pathloss(dB)} = 10\log_{10}\left(\frac{Y}{X_{sc}}\right)$$

where Y is the reference signal received power value, and $X_{sc}$ is the transmit power of the reference signal.

13. The first base station of claim 10, wherein the controller is configured to determine the cell selection bias value based on the pathloss value.

14. A method of controlling serving cell selection in a wireless communication network, the method comprising:
   obtaining a reference signal received power value relating to at least one characteristic of a signal transmitted by a second base station including a second cell operating range which is different from and overlaps with a first cell operating range of a first base station;
   determining, using the obtained reference signal received power value, a reference signal received power bias value for applying, by a user device, to a reference signal received power measured for the second base station when selecting a cell for handover; and
   transmitting the determined reference signal received power bias value to a user device within the first cell operating range of the first base station.

15. The method of claim 14, wherein the obtaining the reference signal received power value further comprises receiving signal measurement reports from user devices within the first cell operating range of the first base station, and
   wherein the determining a cell selection bias value further comprises determining the cell selection bias value for the second base station using the received signal measurement reports.

16. The method of claim 15 wherein the received signal measurement reports comprise one or more of:
   a physical cell identifier;
   the reference signal received power value;
   a geographical location of a user device; and
   a pathloss measurement.

17. The method of claim 15 wherein the received signal measurement reports relate to signals transmitted by a plurality of base stations.

18. The method of claim 17, wherein the received signal measurement reports relate to signals transmitted by the first base station and the second base station.

19. The method of claim 14, further comprising instructing the user devices within the first operating cell range of the first base station to generate the signal measurement reports.

20. The method of claim 19, wherein the instructing the user devices comprises instructing the user devices using one of automatic neighbor relation management, and minimization of drive testing.

21. The method of claim 14, wherein the obtaining the reference signal received power value further comprises exchanging information between the first and second base stations.

22. The method of claim 21, wherein the exchanged information comprises one or more of:
   a transmitted signal power;
   a physical cell identifier; and
   a cell operating type.

23. The method of claim 21, wherein the determining a cell selection bias value further comprises determining a pathloss value responsive to the reference signal received power value.

24. The method of claim 23, wherein the pathloss value is determined using:

$$\text{Pathloss(dB)} = 10\log_{10}\left(\frac{Y \times BW}{X_{Tot}}\right)$$

where Y is the reference signal received power value, $X_{Tot}$ is the total transmit power of the transmitting base station, and BW is the bandwidth in terms of number of subcarriers of the base station transmitting the reference signal.

25. The method of claim 23, wherein the pathloss value is determined using:

$$\text{Pathloss(dB)} = 10\log_{10}\left(\frac{Y}{X_{sc}}\right)$$

where Y is the reference signal received power value, and $X_{sc}$ is the transmit power of the reference signal.

26. The method of claim 23, wherein the determining includes determining the cell selection bias value based on the pathloss value.

27. A non-transitory computer readable recording medium storing computer program code adapted when executed on a processor to perform the method of claim 14.

28. A user device for use in a communications network, the user device comprising:
   a controller operable to obtain a reference signal received power value for signals communicated between the user device and a plurality of base stations, including a first base station and a second base station, within communication range of the user device, the base stations having different and overlapping cell operating ranges; and
   a transceiver operable to receive, from the first base station, a reference signal received power bias value for the second base station, which cell selection bias value has been determined using the reference signal received power value for signals communicated between the user device and the second base station, wherein the controller is further operable to select a base station on which to camp in dependence upon reference signal received power measurements obtained for the plurality of base stations and the reference signal received power bias value.

29. The user device of claim 28, wherein the controller is operable to determine a cell type for each of the plurality of base stations.

30. A method, performed by a user device, of selecting a base station in a wireless communication network, the method comprising:
  obtaining a reference signal received power value for signals communicated between the user device and a plurality of base stations, including a first base station and a second base station, within-communication range of the user device, the base stations having different and overlapping cell operating ranges;
  receiving, from the first base station, a reference signal received power bias value for the second base station, which cell selection bias value has been determined using the reference signal received power value for signals communicated between the user device and the second base station; and
  selecting a base station on which to camp in dependence upon reference signal received power measurements obtained for the plurality of base stations and the reference signal received power bias value.

31. The method of claim 30, further comprising determining a cell type for each of the plurality of base stations.

32. A non-transitory computer readable recording medium storing computer program code adapted when executed on a processor to perform the method of claim 30.

* * * * *